Nov. 25, 1958 W. A. OKENFUSS 2,861,402
WORK HOLDER
Filed March 10, 1955
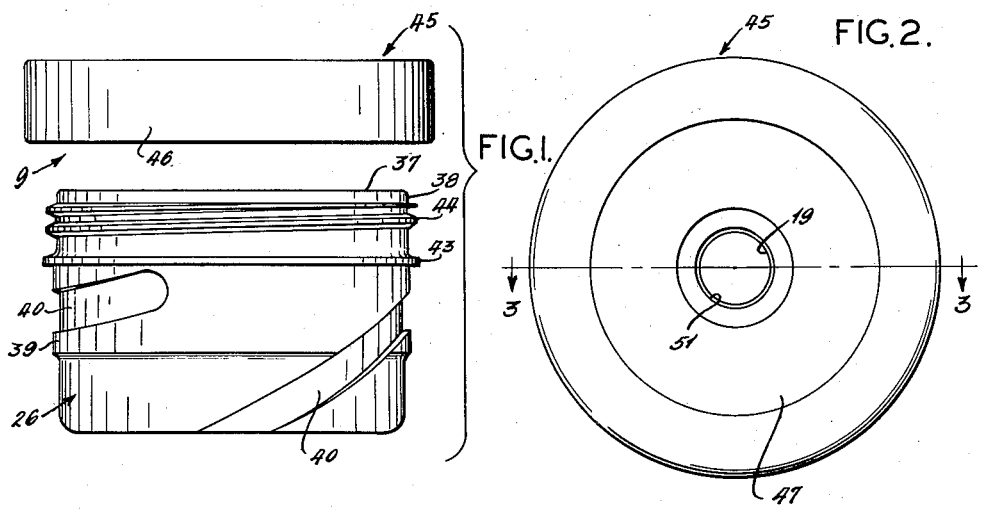
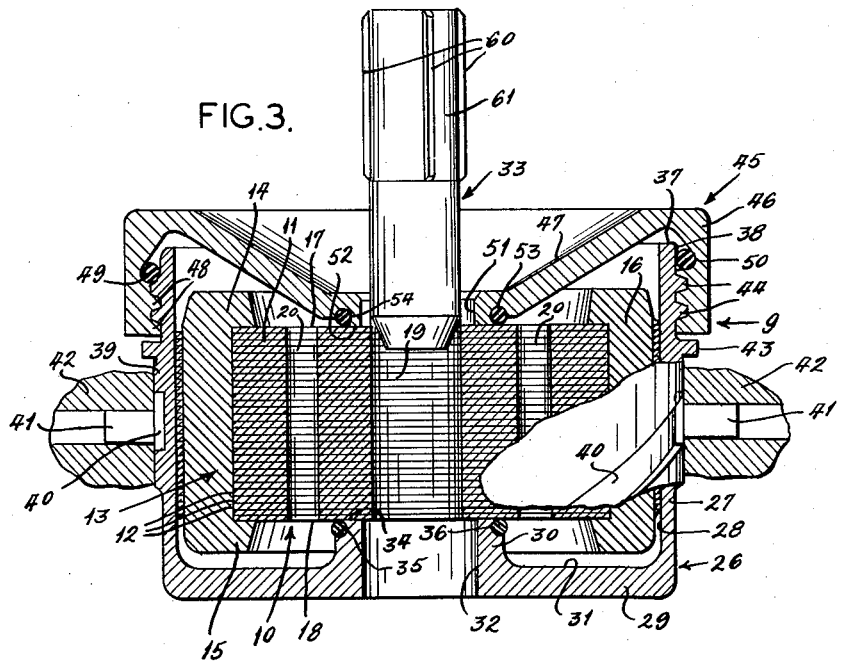
INVENTOR:
WILFRED A. OKENFUSS.
By Gravely, Lieder, Woodruff & Wills
ATTORNEYS.

United States Patent Office 2,861,402
Patented Nov. 25, 1958

2,861,402

WORK HOLDER

Wilfred A. Okenfuss, University City, Mo., assignor to Wagner Electric Corporation, St. Louis, Mo., a corporation of Delaware Application March 10, 1955, Serial No. 493,374

4 Claims. (Cl. 51—217)

This invention relates generally to the finishing of bores in workpieces, and more particularly to a novel holder for enclosing the workpiece during such an operation.

Under present shop practices, honing is the most desirable method of forming bores in workpieces because precise diameters are obtained in a comparatively short time. However, the particles resulting from the honing operation are very abrasive and minute. In machining the shaft bore of dynamo-electric rotors, the particles produced by a honing operation create a serious problem in that they may become lodged between the laminations of the rotor and break down interlamination resistance, which results in poorer motor performance due to increased loss of power and efficiency. Furthermore, once the abrasive particles are positioned between the laminations it is difficult to remove them without marring the protective coating on the laminations. Inasmuch as dynamoelectric rotors for hermetically sealed compressor units are generally mounted on the shaft after the shaft has been installed in the unit, it is considered necessary to hone the shaft bore of the rotor to a predetermined diameter if the tolerance between the bore and the shaft is to be kept at a minimum, even though abrasive particles are produced. Therefore, if great care is not exercised in removing all of the particles from the rotor after the machining operation, the particles may be flushed out into the compressor unit thereby causing damage to valves, bearings and the like or clogging strainers and orifices therein. In short, it is necessary to keep all of the surfaces of the rotor clean as well as to prevent the entrance of particles between the laminations.

Accordingly, it is an object of the present invention to provide a casing for enclosing workpieces whereby the particles produced by machining a shaft bore in the workpiece will be excluded from other surfaces thereof.

A more specific object is to provide a work holder for preventing abrasive particles from becoming lodged between the laminations of a rotor while honing a shaft bore therein.

A still further object of this invention is to provide a simple, inexpensive supporting and protecting holder for a workpiece.

These and other objects and advantages will become apparent hereinafter.

Briefly, the present invention, as applied to a work holder for enclosing and supporting a workpiece having a bore extending between opposite ends thereof, comprises a container and a cover, each of which is provided with continuous sealing and abutment means for sealing engagement with the opposite ends of the workpiece about the bore. An opening is provided in the cover through which a honing tool may be inserted for machining the bore.

The invention also consists in the parts and in the arrangements and combinations of parts hereinafter described and claimed. In the accompanying drawing which forms a part of this specification and wherein like numerals refer to like parts wherever they occur:

Fig. 1 is an exploded elevational view of a work holder embodying the teachings of the present invention, Fig. 2 is a top plan view of the work holder showing the container and cover in assembled relationship, and Fig. 3 is a cross-sectional view taken along line 3—3 of Fig. 2, but showing a honing tool in work-engaging position.

Referring to the drawings, the invention comprises a work holder 9 which is shown applied to a conventional dynamoelectric rotor 10 for the purposes of disclosure, it being apparent that the work holder 9 may be adapted for enclosing any workpiece in which a bore is to be formed. As shown in Fig. 3, the rotor 10 includes a core 11 formed from a plurality of laminated plates 12, and a squirrel cage member 13 having a top plate 14 and a bottom plate 15 with a plurality of spaced bars 16 extending therebetween. The squirrel cage 13 may be formed in an integral unit to position the top plate 14 in abutting relation with one end surface 17 of the core 11 and the bottom plate 15 in abutting relation with the other end surface 18 of the core. Each of the laminated plates 12 may have a central opening formed therein to provide a shaft bore 19 through the center of the core 11, and a plurality of ventilation openings 20 may be formed radially outwardly therefrom. Each of the laminated plates 12 are insulated by any conventional means, such as by annealing, so that maximum motor performance may be obtained during the operation of the rotor.

The work holder 9 for enclosing the workpiece 10 while the shaft bore 19 is being honed to a predetermined smooth diameter comprises a cup-shaped container 26 having a cylindrical wall 27 with a smooth inside surface 28, and a circular base or bottom member 29. The base 29 has a sleeve extension 30 formed integral with the inside bottom surface 31 of the base 29, a central opening 32 being provided in the extension 30 and base 29. The diameter of the opening 32 is larger than the shaft bore 19 so that a rotating honing tool or the like 33 may pass through the opening 32 after engagement with the shaft bore 19, as will be described more fully hereinafter. A flat continuous abutment or contact surface 34 is provided on the inner end of the extension 30 for engagement with the end surface 18 of the rotor 10, and an annular recess 35 is formed in the radially outer edge of the abutment 34. A resilient O-ring or sealing member 36 is positioned in the annular recess 35 for sealing engagement with the end surface 18 of the rotor 10. The cylindrical wall 27 of the container 26 has an open end or rim 37 opposite the base 29, and a seal-engaging surface 38 is provided on the outer periphery of the cylindrical wall 27 adjacent thereto. A sleeve member or annular projection 39 may be secured to or formed integral with the outer periphery of the cylindrical wall 27 substantially equidistant between the bottom 29 and the open end 37 of the container 26. A pair of oppositely positioned spiral grooves 40 is formed in the sleeve member 39 and container wall 27 to extend approximately half-way around the outer periphery of the container 26. The grooves 40 are adapted to receive pins 41 in order to helically position and support the work holder 9 in a honing machine chuck, which includes a guide member 42, such as a sleeve or cup-shaped receptacle. The guide member 42 holds the work holder 9 and rotor 10 in centered position relative to the honing tool 33 during the machining operation, as will be described hereinafter. The container wall 27 is provided with an outwardly-extending radial abutment or flange 43 adjacent to the seal-engaging surface 38 and formed integral with the projection 39.

Fastening means, such as threads 44, are also provided on the outer periphery of the container wall 27 intermediate the surface 38 and the flange 43.

The work holder 9 also includes a cover 45 having a short cylindrical wall 46 and a frusto-conical top or plate 47 formed integral with one end of the wall 46. The inner surface of the wall 46 is provided with fastening means, such as threads 48, adjacent to its other end, the threads 48 being adapted to coact with the threads 44 on the container 26 for securing the cover 45 thereto. An annular depression 49 is formed in the cylindrical wall 46 of the cover 45 intermediate the threads 48 and the top 47 and an annular sealing member or ring 50 is positioned in the depression 49 for sealing engagement on the surface 38 of the container 26. The frusto-conical top 47 of the cover 45 is provided with a central opening 51 having a diameter equal to that of the opening 32 in the extension 30 and base 29 of the container 26 so that the honing tool 33 may be easily passed therethrough. The opening 51 is positioned in substantially the same radial plane as the threads 48, and a continuous abutment or contact surface 52 is formed adjacent to the opening 51 on the inner end of the top 47 for engagement with the end surface 17 of the rotor 10. An annular recess 53 is formed in the radially outer edge of the abutment 52 in which a resilient O-ring or sealing member 54 is positioned for sealing engagement with the end surface 17 of the rotor 10.

Referring to Fig. 3 it will be noted that when the rotor 10 is positioned in the container 26 with the cover 45 secured thereto, the outer periphery of the rotor core 11 is adjacent the inner surface 28 of the container wall 27 and the shaft bore 19 is axially aligned with the bores 32 and 51 in the container 26 and cover 45, respectively. The end surfaces 17 and 18 of the rotor 10 are positioned between the abutments 34 and 52 of the container and cover, and the sealing rings 36 and 54 are engaged on the end surfaces of the rotor 10. Thus, when the cover 45 is tightened on the container 26, the rotor core 11 is compressed between the abutment surfaces 34 and 52 so that the laminated plates 12 will be firmly clamped together and no abrasive particles can be deposited therebetween. The tightening of the cover 45 on the container 26 also causes the sealing rings 36 and 54 to be deformed to provide a seal about each end of the shaft bore 19 although it is apparent that a sealing action is also effected between the ends of the rotor core 11 and the abutments 34 and 52. Inasmuch as a perfect alignment of the shaft bore 19 with the honing tool 33 must be obtained so that the honing tool will evenly remove the proper amount of material from the periphery of the shaft bore, a detailed description of the operation will now be given.

When the squirrel cage 13 has been cast onto the core 11 to form the rotor 10, the openings in each of the laminated plates 12 are substantially aligned to form the shaft bore 19. Defects or imperfections in punching the openings in the plates 12 requires that the bore 19 must be finished to a smooth predetermined diameter before the rotor 10 will be ready for use. The amount of material to be removed from the openings of plates taken from any punch press or the like must be initially determined by the use of suitable calipers and the honing tool 33 is adjusted accordingly. The honing tool 33 includes a plurality of hone elements 60 spaced about the periphery of a rotatable spindle 61 (Fig. 3), which elements 60 are radially adjustable relative to the spindle 61 so that on each successive pass through the shaft bore 19 the elements 60 will be expanded until the predetermined diameter is obtained.

The rotor 10 is inserted into the container 26 with its outer periphery adjacent to the inner surface 28 of the container wall 27 and its end surface 18 abutting the sealing ring 36, which protrudes beyond the abutment 34 thereby preventing a surface contact between the end 18 and the abutment 34. The shaft bore 19 and opening 32 in the bottom 29 of the container 26 are in communication, but may not be accurately aligned. The cover 45 is then placed on the open end 37 of the container so that the sealing member 50 is engaged on the surface 38 of the container wall 27, and the threads 44 and 48 are engaged. The sealing ring 54 is thus positioned on the end surface 17 of the rotor, and the opening 32 in the container and opening 51 in the cover 45 are aligned.

The work holder 9 is then inserted into the guide member 42 with the pins 41 positioned in the spiral grooves 40 in the container wall 27. When the work holder 9 has been positioned in the guide member 42, a dummy shaft (not shown) is inserted through the shaft bore 19 and the openings 32 and 51 of the work holder, and into an indexing hole (not shown) in the guide member 42 so that the rotor is precisely aligned relative to the honing tool 33. The cover 45 is then tightened onto the container 26 so that the rotor core 11 is compressed between the abutments 34 and 52, and the sealing rings 36 and 54 are in sealing engagement therebetween, as previously described.

The dummy shaft is then removed and the shaft bore 19 is aligned with the honing tool 33, the guide member 42 maintaining the work holder 9 and rotor 10 in alignment during the machining operation. The honing tool 33 is reciprocated to carry the rotating hone elements 60 into contact with shaft bore 19 until the predetermined diameter is obtained, after which the particles produced from the shaft bore 19 are removed or flushed out in any suitable manner. Inasmuch as the core 11 is compressed to prevent particles from being lodged between the ends of the laminated plates 12, and the sealing rings 36 and 54 on the end surfaces 17 and 18 seal the shaft bore 19 from the other surfaces of the rotor 10, the particles produced by the honing operation are confined to the rotor surfaces around the shaft bore 19 from which they are removed by the flushing process.

It is now apparent that the rotor 10 may be removed from the work holder 9 and dried, whereby it will be ready for use. The work holder has prevented the particles produced by the honing operation from becoming lodged between or around the laminations and peak performance will be obtained from the rotor when in use.

This invention is intended to cover all changes and modifications of the example of the invention herein chosen for the purposes of disclosure, which do not constitute departures from the spirit and scope of the invention.

What I claim is:

1. A work holder for axially compressing and sealing the laminae of a dynamoelectric rotor core about the shaft bore therethrough during the machining operation on the shaft bore and for sealing the rest of the rotor from the shaft bore, said work holder comprising a container and a cover, said container having an inner wall defining a cavity within said container, said container being open at one end thereof, a laterally extending first end wall disposed at the opposite end of said container, said first end wall supporting a first central longitudinally extending sleeve extension projecting into said cavity, said first sleeve extension having an opening formed longitudinally therethrough, the outer wall of said sleeve extension being spaced a substantial distance from said inner wall of the container, said first sleeve extension having a first abutment on its unattached end, a first resilient sealing ring supported by said first sleeve extension adjacent said first abutment, said cover having an inner wall engaged with the outer wall of said container in overlapping relation thereto adjacent said open end of the container, a second resilient sealing ring disposed between said cover and the outer wall of said container, said cover having a laterally extending second end wall, said laterally extending second end wall also extending longitudinally and projecting into said cavity, said second end wall supporting a second central longitudinally extending sleeve extension projecting into said cavity, said second sleeve extension having an opening formed longitudinally therethrough, the outer wall of said second sleeve extension and the inner surface of said second end wall adjacent said second sleeve extension being spaced a substantial distance from said inner wall of the container, said second sleeve extension having a second abutment formed on its unattached end, a third resilient sealing ring supported by said second sleeve extension adjacent said second abutment, whereby a rotor positioned in said holder has one of its ends engaged with said first abutment and first sealing ring and its opposite end engaged with said second abutment and third sealing ring so that the shaft bore is circumscribed thereby and in axial alignment with the openings through said sleeve extensions, a portion of the rotor extending longitudinally beyond said abutments toward the adjacent end portions of said container and being disposed in the space between the outer walls of said sleeve extensions and the inner wall of said container, and means maintaining said cover and container in fixed overlapping relationship whereby the rotor core is compressed between said abutments.

2. A work holder as defined in claim 1 wherein said second end wall is substantially frustoconical in configuration.

3. A work holder as defined in claim 1 wherein said last mentioned means includes a threaded portion on said outer wall of the container and a cooperating threaded portion formed on said inner wall of the cover.

4. A work holder as defined in claim 1 wherein the outer wall of said container is provided with guide means for positioning and supporting the work holder in a honing machine chuck.

References Cited in the file of this patent

UNITED STATES PATENTS

| | | |
|---|---|---|
| 1,156,292 | Johnson et al. | Oct. 12, 1915 |
| 1,292,735 | Elliott | Jan. 28, 1919 |
| 1,654,174 | Kistner | Dec. 27, 1927 |
| 1,740,542 | Gallimore et al. | Dec. 24, 1929 |
| 1,885,178 | Bsteh | Nov. 1, 1932 |
| 2,147,453 | Miner | Feb. 14, 1939 |
| 2,730,370 | Brewster | Jan. 10, 1956 |